United States Patent

Spies

[15] 3,700,968
[45] Oct. 24, 1972

[54] ELECTRIC FUSE CIRCUIT
[72] Inventor: Johann Spies, Pfaffenhofen, Ilm, Germany
[73] Assignee: Messerschmitt-Bolkow-Blohm Gesellschaft mit beschrankter Haftung, Munchen, Germany
[22] Filed: Dec. 30, 1971
[21] Appl. No.: 214,302

[30] Foreign Application Priority Data

Jan. 20, 1971 Germany..........P 21 02 499.7

[52] U.S. Cl. .....................317/31, 307/246, 307/251, 307/293, 317/33 SC, 317/36 TD, 317/40 A, 320/1
[51] Int. Cl. ............................................H01h 47/18
[58] Field of Search....307/30 A, 279, 246, 202, 251, 307/293; 317/33 SC, 40 A, 36 TD, 31; 320/1

[56] References Cited

UNITED STATES PATENTS

| | | | |
|---|---|---|---|
| 3,390,382 | 6/1968 | Igarashi | 307/279 X |
| 3,403,270 | 9/1968 | Pace et al. | 317/31 |
| 3,638,047 | 1/1972 | Klein | 307/246 X |

*Primary Examiner*—James D. Trammell
*Attorney*—John J. McGlew et al.

[57] ABSTRACT

An electric timing circuit, for the time-delayed delivery of a voltage pulse to an electric fuse element, has a voltage source, preferably designed as a capacitor which can be charged from an external source of electric potential. The capacitor discharges across a resistance and a threshold value switch connects the fuse element with the voltage source when the source voltage falls below a preset value. The threshold value switch is constituted by a first field effect transistor having its drain-source path in the electric timing circuit and a second field effect transistor having its drain-source path connected in parallel with that of the first transistor, and having an insulated grid electrode. The drain electrode of each transistor is connected to the grid electrode of the other transistor. The fuse element, in one embodiment of the invention, is in series with a thyristor whose gating circuit is connected to a resistor connected in the drain-source path of the second transistor. In a second embodiment of the circuit, the fuse element is connected in series with the source voltage capacitor and the drain-source path of the second transistor.

7 Claims, 2 Drawing Figures

ELECTRIC FUSE CIRCUIT

FIELD OF THE INVENTION

This invention relates to electric timing circuits and, more particularly, to a new and improved electric timing circuit for the time-delayed delivery of a voltage pulse to an electric fuse element and using a capacitor, charged from an external source, as a voltage source, and a threshold value switch connecting the fuse element with the voltage source when the output voltage of the source falls below a preset value.

BACKGROUND OF THE INVENTION

Electric timing circuits of this type are used, for example, in electric shell fuses, to prevent premature ignition of an electric fuse element, or to ignite it at a specific time. In such known electric timing circuits, such as shown in German Pat. DAS 1, 155,037, generally the electric charge of a storage capacitor is transferred to a fuse capacitor through a charge-transferring resistor. When the voltage reaches a certain value, an electric threshold value switch, connected with the fuse capacitor, and which may be, for example, a glow lamp, a spark gap, or a four-layer diode, is closed to connect the charge of the fuse capacitor to a fuse element.

The time constants of such electric timing circuits cannot be made very large, because, if they are made large, the leakage currents of the components used in the circuit reach magnitudes which correspond approximately to the currents flowing through the charge-transferring resistors. High leakage currents also result when the known electric timing circuits are operated at high ambient temperatures. In both cases, the storage capacitors are discharged prematurely, that is before the termination of the charge transfer, so that the voltage at the fuse capacitor does not attain the voltage necessary for closing of the threshold value switch. Hence, ignition of the fuse element cannot occur.

If leakage currents occur during transfer of the charge of the storage capacitor to the fuse capacitor, a shell provided with such electric timing circuits may, under the above mentioned circumstances, become a dud, and moreover possibly may constitute danger for one's own personnel.

SUMMARY OF THE INVENTION

The objective of the invention is to provide an electric timing circuit without a charge-transferring capacitor, and whose time constant can be varied, within wide limits, up to very high values, and which delivers a voltage pulse suitable for ignition of an electric fuse element even in the case of a possibly premature discharge of a storage capacitor caused, for example, by leakage currents.

The invention is directed to an electric timing circuit, for the time-delayed delivery of a voltage pulse to an electric fuse element, having a voltage source which is preferably a capacitor discharging across a resistance and having a threshold value switch connecting the fuse element with the voltage source when the voltage of the source falls below a predetermined value. In accordance with the invention, the threshold value switch consists of a field effect transistor having its drain-source path or circuit in the electric timing circuit, and another field effect transistor, with an insulated grid, having its drain-source path connected in parallel with that of the first field effect transistor. The drain electrode of each transistor is connected to the grid electrode of the other field effect transistor.

Owing to the fact that field effect transistors with an insulated grid electrode, for example, metal-oxide-silicon field effect transistors, have, in the cut-off state and owing to their channel resistance which is in the range of some GOhm, very low leakage currents, of the order of some pA, a premature discharge of the voltage source, which is preferably a capacitor, is nearly impossible. The time constant of the electric timing circuit therefore can be selected to be very large, up to 60 minutes, for example. If nevertheless higher leakage currents than theoretically expected should occur in the electric timing circuit, for example, through the use of components of insufficient quality or through improper circuitry, a voltage pulse, sufficient for the excitation of the electric fuse element, nevertheless will be delivered due to the feedback of the two field effect transistors.

In fact, if the grid voltage, supplied by the voltage source, of the field effect transistor having its drain-source path or circuit included in the timing circuit, falls below a certain value, this field effect transistor, which until then was conducting through its drain-source path, slowly changes over to the non-conducting state. As a result, and through the electrical connection between the drain electrode of the first transistor and the grid electrode of the second field effect transistor, the second transistor is gradually brought into the conducting state. At a certain gain or amplification value of the second field effect transistor, the feedback of its drain electrode with the grid of the first field effect transistor causes the first transistor to change over to the cut-off state suddenly. As a result of this, the second transistor becomes conductive therethrough, and applies the remaining residual voltage of the voltage source to the fuse element.

The switch effect of the two back-coupled transistors, initiating the ignition of the fuse element, thus is determined, in accordance with the invention, only by a decrease of the voltage of the voltage source below a predetermined value. The moment of ignition, when unforeseeable leakage currents occur, will, however, be earlier than the moment defined by the theoretically determinable time constant. A shell equipped with a timing circuit in accordance with the invention therefore cannot become a dud, so that the danger for one's own personnel associated with the shell is likewise eliminated.

In accordance with the further preferred embodiment of the invention, the electric timing circuit is characterized in that the output of the switch, formed by the two field effect transistors, is connected with the control or gating electrode of a controllable electric valve which is connected, in the non-conducting direction, with the fuse element and with the voltage source. With this arrangement, the entire residual voltage of the voltage source, present before the switching operation which initiates the ignition of the fuse element, is applied to the fuse element.

An object of the invention is to provide an improved electric timing circuit for the time-delayed delivery of a voltage pulse to an electric fuse element.

Another object of the invention is to provide such an electric timing circuit including a voltage source preferably designed as a capacitor and discharging across a resistance.

A further object of the invention is to provide such an electric timing circuit which does not require a charge-transferring capacitor, and whose time constant can be varied within wide limits up to very high values.

Another object of the invention is to provide such an electric timing circuit which delivers a voltage pulse sufficient for ignition of an electric fuse element even in the case of a possibly premature discharge of a storage capacitor caused, for example, by leakage currents.

For an understanding of the principles of the invention, reference is made to the following description of typical embodiments thereof as illustrated in the accompanying drawing.

DESCRIPTION OF THE PREFERRED EMBODIMENTS

Figure 1:
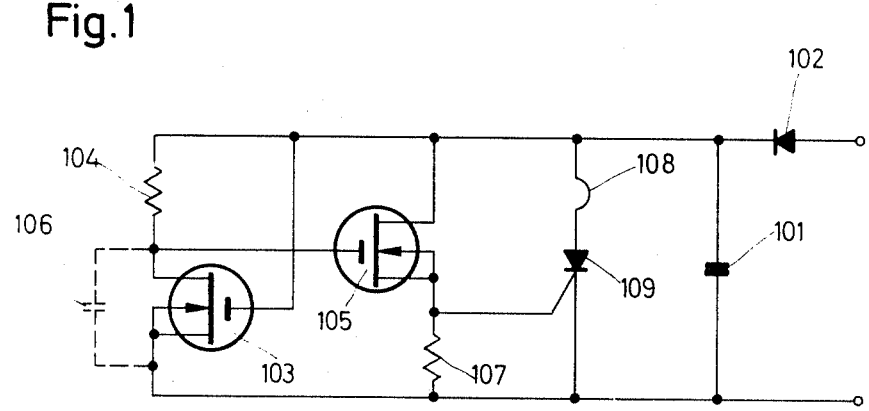
FIG. 1 is a schematic wiring diagram of one form of electric timing circuit embodying the invention and providing a time-delayed delivery of a voltage pulse to an electric fuse element, and using two metal-oxide silicon field effect transistors of the n-channel enrichment type.

Referring first to FIG. 1, a capacitor 101, serving as a voltage source for an electric timing circuit, is charged, from an external voltage source which has not been shown, through a diode 102. The charging rate and final voltage of capacitor 101 are so rated that the voltage at the grid of a metal-oxide-silicon field transistor 103, of the n-channel enrichment type, exceeds the threshold voltage, and a charging of the channel capacity of transistor 103 is avoided. For ready reference, this transistor will hereinafter be called "-transistor." Thereby, transistor 103 becomes conducting in its channel defined by the source-drain path or circuit so that, after disconnection of the external voltage source, capacitor 101 can gradually become discharged through the source-drain path of transistor 103, and a resistor 104.

The drain electrode of transistor 103 is connected with the grid of an additional transistor 105 of the same type, whose grid threshold voltage is smaller than that of transistor 103, so that transistor 105 cuts off as soon as the channel of transistor 103 becomes conductive during the charging process. In addition, to prevent transistor 105 from becoming conductive during the charging of capacitor 101, a capacitance, for example, in the form of a capacitor 106, may be connected in parallel with the channel of transistor 103. This is illustrated in broken lines in FIG. 1.

After disconnection of the external voltage source, the voltage at capacitor 101 drops due to the discharge process, and thus the grid voltage of transistor 103 also drops in accordance with the time constant determined by the capacitance of capacitor 101 and the ohmic value of resistor 104. When the grid voltage of transistor 103 decreases below the threshold value voltage, transistor 103 gradually changes over to the cut-off state as a result of which the grid voltage of the second transistor 105, through transistor 104, increases. When this latter voltage exceeds the threshold voltage of transistor 105, there flows through the drain-source path or circuit thereof a current which, for one thing, further discharges capacitor 101 and, for another, allows the voltage at the grid electrode of transistor 103 to decrease further through the feedback of the drain electrode of transistor 105 to the grid electrode of transistor 103.

When the total gain or amplification reaches a value which exceeds the value 1, there occurs a sudden feedback by which transistor 105 becomes fully conductive through the action of resistor 104. At the same time, transistor 103 is cut-off, so that a leak resistor 107, connecting the source electrode of transistor 105 with the negative terminal of capacitor 101, can be traversed by a current of a few mA. This current serves to open or gate a thyristor connected in series with a fuse element 108 and in parallel with capacitor 101, through its gating electrode. Consequently, the entire residual charge still remaining on capacitor 101 flows through the fully conductive thyristor 109 and the electrode fuse element 108, and the fuse element, in turn, causes an explosive charge, which has not been shown, to detonate.

Since, in connection with semi-conductor technology, components have been developed, such as for example thyristors, which, at a cutting off voltage of 100 V and at an ambient temperature of about 70° C, exhibit residual currents in the nA range only, and since commercial tantalum capacitors, also having a residual current in the nA range are commercially available, it is possible to obtain time constants up to about 60 minutes by using values of resistor 104 in the range from approximately 1 MOhm to 1000 Mohms.

However, if the residual currents within the electric circuits shown in FIG. 1 should be greater than theoretically expected, the switching effect, initiated by the transistors 103 and 105, simply occurs at an earlier time than that calculated theoretically, as this switching effect depends only on the voltage value of capacitor 101.

Figure 2:
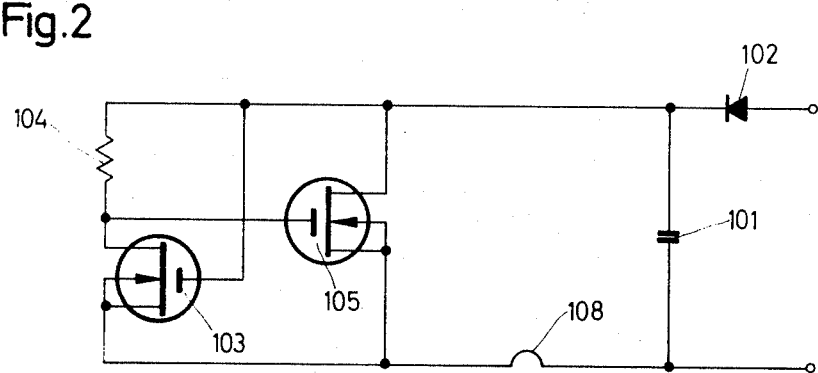
FIG. 2 is a schematic wiring diagram of a second embodiment of the invention.

In the circuit shown in FIG. 1, electric fuse element 108 is traversed by an electric current exciting the fuse element only when thyristor 109 is triggered conductive by the voltage pulse released by the two transistors 103 and 105. FIG. 2 illustrates another embodiment of the invention in which the thyristor is omitted. Referring to FIG. 2, fuse element 108 is connected directly into the electric timing circuit, which is formed by capacitor 101, resistor 104 and the channel of transistor 103. The operation of the timing circuit shown in FIG. 2 is identical to that already described for FIG. 1, and like reference characters have been used, for like components, in FIGS. 1 and 2.

In the circuit of FIG. 2, resistor 104 must have its values so selected that the discharge current flowing through fuse element 108 during the conducting state of transistor 103 is smaller by some powers of ten than the current exciting the fuse element.

As long as the voltage applied to the grid of transistor 103 is above the threshold value thereof, transistor 105, whose channel is connected in parallel with the channel of transistor 103, is cut-off. When the grid voltage of transistor 103 falls below the threshold value, transistor 103 gradually changes over into the cut-off state, so that the grid of transistor 105 has its voltage value raised through resistor 104 and transistor 105 gradually becomes conductive. As a result there flows, through the inherent resistance of fuse element 108, a current higher than that flowing before conducting of transistor 105. Thus, the source potential of transistor 103 is raised to such an extent that this transistor changes over to the cut-off state. Thereby, through the feedback of the respective source electrodes of transistors 103 and 105, transistor 105 becomes fully conductive so that capacitor 101 discharges very quickly through the channel of transistor 105 and fuse element 107, and energizes the fuse element.

Although the circuits have been described as including field effect transistors of the n-channel enrichment type, it is of course possible, within the scope of the invention, to use field effect transistors of the p-channel enrichment type.

The electric timing circuit shown in FIGS. 1 and 2 have the advantage that the time constant can be adjusted over a very wide range by the rating of the charging voltage of the capacitor, and which is then limited only by the respective breakdown voltages of the components included in the timing circuit. Possibly existing unforeseeable leakage currents in the circuits, which cause a more rapid decrease than expected of the voltage applied to the capacitor, do not impair the operation of the electric timing circuits, as the fuse element is energized independently of the time response of the capacitor voltage at the given threshold voltage of the transistors.

While specific embodiments of the invention have been shown and described in detail to illustrate the application of the principles of the invention, it will be understood that the invention may be embodied otherwise without departing from such principles.

What is claimed is:

1. In an electric timing circuit, for the time-delayed delivery of a voltage pulse to an electric fuse element, of the type including a self-contained voltage source and a threshold value switch connecting the voltage source to the fuse element when the voltage of the source falls below a preset value, the improvement comprising, in combination, a first field effect transistor having its drain-source path in said electric timing circuit; a second field effect transistor having its drain-source path connected in parallel with the drain-source path of said first transistor, and having an insulated grid electrode; and respective means connecting the drain electrode of each transistor to the grid electrode of the other transistor; said transistors constituting said threshold value switch.

2. In an electric timing circuit, the improvement claimed in claim 1, in which said voltage source is a capacitor discharging across a resistance.

3. In an electric timing circuit, the improvement claimed in claim 2, including an electric valve connected in series with said electric fuse element and having a control electrode; said threshold value switch, constituted by said first and second transistors, having its output connected to said control electrode.

4. In an electric timing circuit, the improvement claimed in claim 3, in which said electric valve is a thyristor.

5. In an electric timing circuit, the improvement claimed in claim 2, in which said electric fuse element is connected in said timing circuit.

6. In an electric timing circuit, the improvement claimed in claim 5, in which said electric fuse element is connected in a series circuit including the drain-source path of said second transistor and said capacitor; said series circuit being in parallel with said resistance across which said capacitor discharges.

7. In an electric timing circuit, the improvement claimed in claim 2, including a pair of terminals for connection to an external source of electric potential; said capacitor being connected across said terminals in series with a diode; and a second capacitor connected in parallel with the drain-source path of said first transistor and preventing conduction of said second transistor during charging of said first-mentioned transistor from said external source.

* * * * *